US008464772B2

(12) United States Patent
Bittner

(10) Patent No.: US 8,464,772 B2
(45) Date of Patent: Jun. 18, 2013

(54) LABELLING MACHINE AND DISPENSING APPARATUS FOR LABELLING MACHINES

(75) Inventor: Willibald Bittner, Abendsberg-Offenstetten (DE)

(73) Assignee: Krones AG (DE)

( * ) Notice: Subject to any disclaimer, the term of this patent is extended or adjusted under 35 U.S.C. 154(b) by 431 days.

(21) Appl. No.: 12/543,033

(22) Filed: Aug. 18, 2009

(65) Prior Publication Data

US 2010/0038034 A1 Feb. 18, 2010

(30) Foreign Application Priority Data

Aug. 18, 2008 (DE) ......................... 10 2008 038 145

(51) Int. Cl.
*B32B 37/00* (2006.01)
*B65C 9/18* (2006.01)

(52) U.S. Cl.
USPC ........................................... 156/541; 156/542

(58) Field of Classification Search
USPC .......................................... 156/540, 541, 542
See application file for complete search history.

(56) References Cited

U.S. PATENT DOCUMENTS

| | | | | |
|---|---|---|---|---|
| 3,238,080 A * | 3/1966 | Schluter | 156/351 |
| 4,267,004 A | 5/1981 | Anderson | 156/361 |
| 4,624,734 A | 11/1986 | Voltmer et al. | 156/541 |
| 5,188,696 A | 2/1993 | Good, Jr. | 156/361 |
| 5,306,375 A * | 4/1994 | Leonard | 156/249 |
| 5,490,898 A * | 2/1996 | Koyama | 156/540 |
| 5,540,795 A * | 7/1996 | Franklin et al. | 156/64 |
| 5,795,085 A * | 8/1998 | Yoo | 400/248 |
| 5,820,728 A * | 10/1998 | Stevens et al. | 156/577 |
| 5,925,214 A | 7/1999 | Klein et al. | 156/556 |
| 6,595,260 B2 * | 7/2003 | Tamai et al. | 156/577 |
| 6,729,377 B2 * | 5/2004 | Huthmacher | 156/577 |
| 7,117,915 B2 * | 10/2006 | Rolion | 156/577 |
| 2002/0195205 A1 * | 12/2002 | Watanabe | 156/577 |

FOREIGN PATENT DOCUMENTS

| | | |
|---|---|---|
| DE | 1 761 837 | 5/1971 |
| DE | 34 16 658 | 7/1985 |
| FR | 2 737 185 | 1/1997 |
| GB | 2 425 298 | 10/2006 |
| WO | WO 2007/118290 | 10/2007 |

OTHER PUBLICATIONS

European Office Action, dated Oct. 11, 2011 (4 pgs).
Chinese Office Action, dated Oct. 24, 2011 (10 pgs).
Chinese Office Action, Appln. No. 2009101713344 dated May 18, 2012 (10 pgs).
Chinese Office Action issued for 2009101713344, dated Sep. 11, 2012 (6 pgs), and English translation (10 pgs).

* cited by examiner

*Primary Examiner* — Mark A Osele
(74) *Attorney, Agent, or Firm* — Hayes Soloway P.C.

(57) ABSTRACT

A dispensing apparatus for labeling machines for applying labels, which are supplied via a carrier belt carrying a plurality of labels, to bottles and in particular to bottle necks, has a dispensing arm and a dispensing head which is arranged on the dispensing arm and has a dispensing edge for deflecting the carrier belt in order thereby to detach a respective label, wherein the dispensing edge and/or the dispensing head is pivotable in order to adjust a movement direction of the labels being detached from the carrier belt.

13 Claims, 2 Drawing Sheets

LABELLING MACHINE AND DISPENSING APPARATUS FOR LABELLING MACHINES

FIELD OF THE INVENTION

The invention relates to a dispensing apparatus for labelling machines, and also to a labelling machine.

BACKGROUND OF THE INVENTION

Labelling machines are used to apply labels to bottles.

A dispensing apparatus for labelling machines and also a labelling machine are already known from the German laid-open specification 1 761 837 by the Applicant. Said document proposes a configuration which can be used both to wrap metal foil around bottle necks and to apply labels to bottles. According to German laid-open specification 1 761 837, the labels are removed individually from a magazine by means of a glue-covered cylinder and are transferred by means of grippers to a labelling cylinder before being applied to the bottle.

Such apparatuses, in which the labels are removed individually from a magazine and are transported to the bottle, are very complicated since the labels must be handled individually during the entire transport path from the magazine to the bottle.

By contrast, this disadvantage is avoided by labelling machines known to the Applicant in which the labels are applied to a carrier belt carrying a plurality of labels.

In such configurations, the carrier belt is moved—e.g. continuously—to a location at which a label or labels are to be dispensed in the direction of a bottle or in the direction of the bottles. There, the carrier belt is sharply deflected by means of a so-called dispensing edge, so that the respective label adhering to the carrier belt detaches from the carrier belt at the dispensing edge and can be applied individually to the bottle. In the labelling machines known to the Applicant in which the labels are moved in the direction of the bottles using a carrier belt which carries a plurality of labels, the so-called dispensing edge is typically oriented vertically, so that it runs essentially in the direction of the axis of upright bottles running past. This makes it possible for the labels to be detached from the carrier belt in a manner oriented so that they can easily be applied to a respective essentially cylindrical bottle middle, in such a way that they run with their longitudinal extension direction in the circumferential direction of the bottle middle. This has proven advantageous to date.

However, the application of the labels in the aforementioned configuration is more difficult if labels are to be applied to bottle necks which taper upwards. In order to counteract these difficulties, the labelling machine for dispensing labels that are to be applied to the bottle neck is currently brought—at least according to the internal knowledge of the Applicant—into a tilted position relative to the bottles moving past. This improves the feeding of the labels towards the bottles that are to be provided with a label in the region of their bottle neck, but is also complicated.

The known configuration is possible only with parallel carrier belt guidance. Furthermore, in the case of packages with fancy decorations, an expensive special stand is required. For this, use is made of a special stand with up to six adjustable axes. The ergonomics are in this case sometimes very poor, and operation is possible only with the stand. In some cases, no automatic gluing is even possible.

The object of the invention is therefore to provide a flexible but nevertheless fairly uncomplicated possibility for labelling bottles.

SUMMARY OF THE INVENTION

There is therefore proposed in particular a dispensing apparatus for labelling machines for applying labels, which are supplied via a carrier belt carrying a plurality of labels, to bottles, comprising a dispensing arm and a dispensing head. The dispensing head is in this case arranged on the dispensing arm, and namely in particular is arranged directly on the dispensing arm. The dispensing head forms a dispensing edge. This dispensing edge is provided for deflecting the carrier belt, namely in such a way that a respective label currently located at this dispensing edge detaches from the carrier belt as a result of this deflection.

The dispensing apparatus is in particular also provided for applying labels in the region of the bottle neck of a bottle, which tapers upwards for example. In certain embodiments, said bottle neck may also be designed to taper downwards. In particular, the dispensing apparatus is provided for flexible adaptation to surface regions that run differently in space on bottles that are to be provided with a label, such as for example for applying middle labels on the one hand and for applying neck labels on the other hand.

According to the invention, the dispensing edge and/or the dispensing head is pivotable in order to adjust the movement direction of the labels being detached from the carrier belt.

It may be provided that this pivotability allows a 2-dimensional pivoting, i.e. a pivoting in one plane; however, it may also be provided that this pivotability allows a 3-dimensional pivoting, i.e. a pivoting in space.

Account is preferably taken of the fact that the carrier belt is twisted at least slightly over its extension direction or the carrier belt is guided at least in some portions along the dispensing apparatus in such a way that it is slightly twisted. In other words, the pivoting of the dispensing head or dispensing edge brings about a change in the twisting of the carrier belt relative to the transport path of the carrier belt.

Until now, it has been assumed that such a twisting is not possible since the labels might otherwise also detach undesirably from the carrier belt at another location due to the twisting. In the course of complicated experiments, the Applicant has surprisingly found that a certain degree of twisting of the carrier belt with the labels arranged thereon is possible, without the labels detaching from the carrier belt as a result of this twisting. This permissible degree of twisting also depends in particular on the width of the carrier belt.

Preferably, the dispensing head is arranged pivotably on the dispensing arm in order to adjust the movement direction of the labels being detached from the carrier belt. To this end, for example, a second articulated connection may be provided between the dispensing head and the dispensing arm. This second articulated connection may be formed for example by means of a rotary articulation or a pure pivoting articulation, i.e. an articulation which allows only a limited pivotability in terms of the pivot angle, or by means of a ball joint, or by another such articulation. With particular preference, the coupling point between the dispensing head and the dispensing arm is designed as a second articulation or as a second articulated connection, wherein this second articulation or this second articulated connection is in particular the aforementioned second articulation or the aforementioned second articulated connection.

Preferably, in order to adjust the movement direction of the labels being detached from the carrier belt, a third articulation or a third articulated connection is provided within the dispensing arm. This is in particular so that the dispensing head and/or the dispensing edge is pivotable. This third articulation or this third articulated connection may in particular be formed for example by means of a rotary articulation or a pure pivoting articulation, i.e. an articulation which allows only a limited pivotability in terms of the pivot angle, or by means of a ball joint, or by another such articulation.

Preferably, the dispensing edge is arranged pivotably on the dispensing head in order to adjust the movement direction of the labels being detached from the carrier belt. To this end, for example, a first articulated connection may be provided between the dispensing edge and the dispensing head. This first articulated connection may be formed for example by means of a rotary articulation or a pure pivoting articulation, i.e. an articulation which allows only a limited pivotability in terms of the pivot angle, or by means of a ball joint, or by another such articulation. With particular preference, the coupling point between the dispensing edge and the dispensing head is designed as the first articulation or as the first articulated connection, wherein this first articulation or this first articulated connection is in particular the aforementioned first articulation or the aforementioned first articulated connection.

It may be provided that the first articulated connection and/or the second articulated connection and/or the third articulated connection can be locked. To this end, a first or second or third locking device may respectively be provided.

In one particularly preferred embodiment, it is provided that the first articulated connection and/or the second articulated connection and/or the third articulated connection is configured in such a way that it allows a pivoting of the dispensing edge from a vertical orientation into an orientation that is inclined relative to the vertical orientation. With particular preference, it is provided that the first articulated connection and/or the second articulated connection and/or the third articulated connection is configured in such a way that the dispensing edge is in the process moved within one or the same plane, i.e. during the aforementioned pivoting from the vertical orientation of the dispensing edge into an orientation of the dispensing edge that is inclined relative to said vertical orientation.

Preferably, the dispensing apparatus comprises one or more deflecting devices, in particular deflecting rollers, for deflecting the carrier belt, namely in such a way that the labels do not detach during this deflection.

In one preferred embodiment, the dispensing edge is arranged fixedly on the dispensing head. This is in particular such that the dispensing edge is arranged on the dispensing head in such a way that it cannot move relative to the dispensing head.

It may be provided that the dispensing head is arranged fixedly on the dispensing arm. This is in particular such that the dispensing head is arranged on the dispensing arm in such a way that it cannot move relative to the dispensing arm.

According to one preferred embodiment, in order to adjust the movement direction of the labels being detached from the carrier belt, an articulation is provided and in addition to this articulation at least one articulation is provided within the pivoting arm.

With particular preference, an articulation for articulating the dispensing arm on a machine frame is furthermore provided on the side of the dispensing arm remote from the dispensing head.

It is provided in particular that the carrier belt is twisted. The dispensing apparatus may also be referred to as the dispensing unit.

In a further preferred embodiment, the dispensing head is pivotable relative to the abovementioned articulation in a direction perpendicular to a direction of extension of the dispensing arm extending between the articulation and the dispensing head. In this case, it is possible that said portion of the dispensing arm is arranged such that it can rotate relative to the articulation; however, it would also be conceivable that the portion of the dispensing arm is arranged rigidly relative to the articulation, and the dispensing head can in turn rotate relative to the portion of the dispensing arm.

At least advantageous further developments of the invention offer in particular the following advantages: They offer a high degree of flexibility and almost all decorations comprising self-adhesive labels can be processed. Furthermore, they are cost-effective since only a standard stand is required. Moreover, they are easy to operate and the shape is ergonomic. Furthermore, automatic gluing is possible. This configuration is also suitable for modular machines. Almost all desired decorations can be processed using one dispenser or one dispensing apparatus.

BRIEF DESCRIPTION OF THE DRAWINGS

Examples of embodiments of the invention will be explained in more detail below, wherein it should be noted that the invention is in no way limited thereto. In the drawings.

Figure 1:
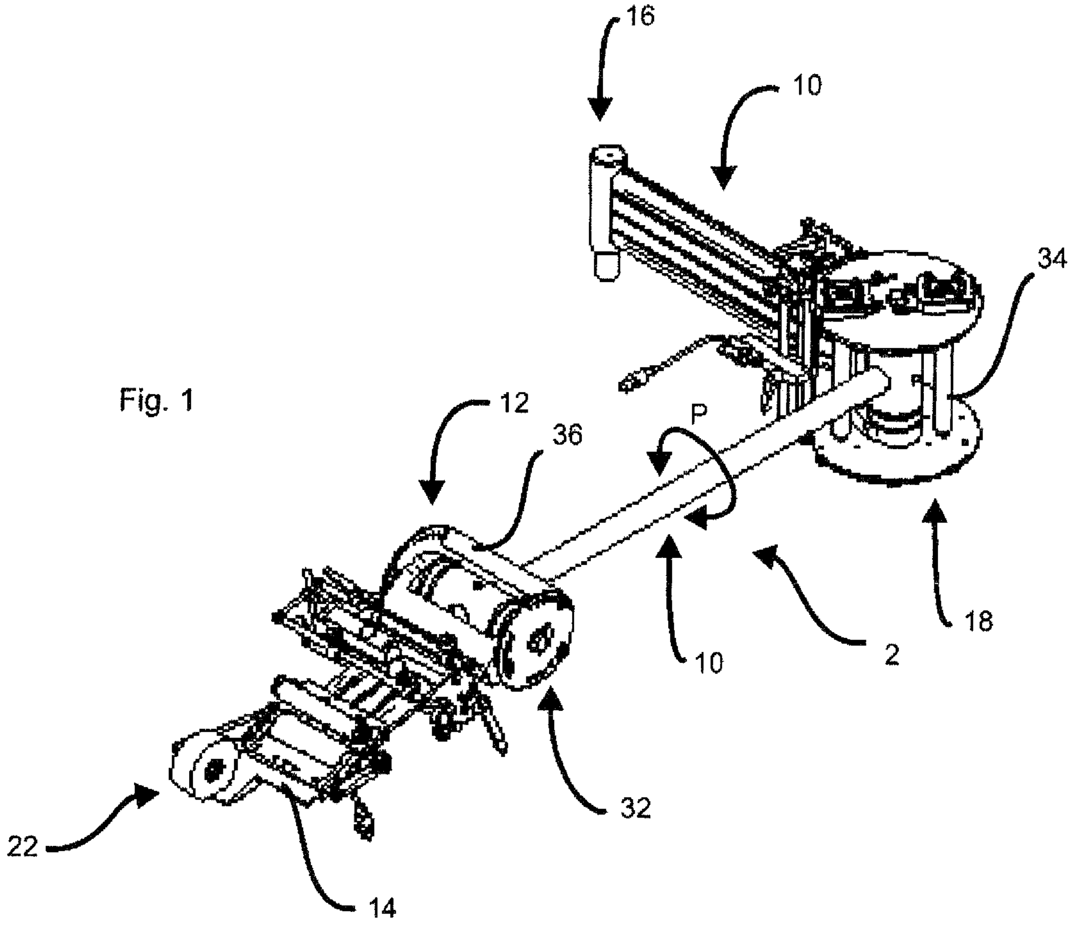
FIG. 1 to FIG. 4 show different views of an example of an embodiment according to the invention of a labelling machine according to the invention which comprises an example of a dispensing apparatus according to the invention, namely in a partially schematic view in each case.

The figures show an example of an embodiment of a labelling machine 1 according to the invention, in a schematic partial view.

DETAILED DESCRIPTION

This labelling machine 1 comprises a dispensing apparatus 2 for applying labels, which are supplied via a carrier belt (not shown) carrying a plurality of labels, to bottles and in particular to bottle necks and bottle middles. The dispensing apparatus comprises a dispensing arm 10 and a dispensing head 12 which is arranged on the dispensing arm 10 and has a dispensing edge 14 for deflecting the carrier belt in order thereby to detach a respective label.

Furthermore, the dispensing head 12 has a pressing roller 22 for pressing the label onto the bottle.

The dispensing arm 10 has an articulation 16 for articulation on a machine frame, an articulation 18 arranged within the dispensing arm 10, and an articulation 20 (cf. double-headed arrow P) which differs from the two aforementioned articulations and which allows a pivotability of the dispensing head 12 in order to adjust the movement direction of the labels being detached from the carrier belt. In other words, the dispensing arm 12 is formed in two parts here. Via the articulation 18, the two portions of the dispensing arm 12 are designed such that they can pivot relative to one another.

The overall length of the dispensing arm can preferably vary. For example, it would be possible for that portion of the dispensing arm 10 which is located between the dispensing head 12 and the articulation 18 to be variable with regard to its length, for example to be designed in a telescopic manner.

As mentioned above, depending on the width of the carrier belt, only a certain twisting of the carrier belt is possible without the labels detaching from the carrier belt as a result of this twisting. More specifically, less twisting is possible in the case of wider carrier belts than in the case of narrower carrier belts. By lengthening the dispensing arm in that region in which the twisting occurs, the twisting relative to the transport path of the carrier belt can be reduced and thus the risk of detachment of the labels as a result of the twisting can be counteracted.

As illustrated by the arrow P shown in FIG. 1, the portion of the dispensing arm 10 which is located between the dispensing head 12 and the articulation 18 is preferably arranged rotatably on the articulation 18. However, as mentioned above, it would also be possible for the dispensing head 12 to be arranged rotatably on said portion of the dispensing arm 10. In this case, preferably only a rotation within a certain angle range is possible, in order to ensure that there is no excessive twisting of the carrier belt which leads to an undesired detachment of the labels. In order to rotate the dispensing head 12 relative to the dispensing arm, further articulations 20 may be provided at one or the other end of said portion of the dispensing arm 10.

Figure 2:
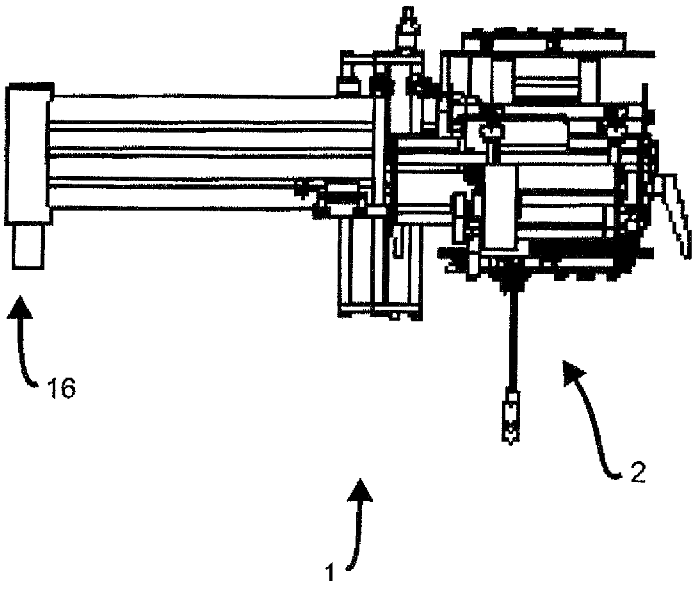
Figure 3:
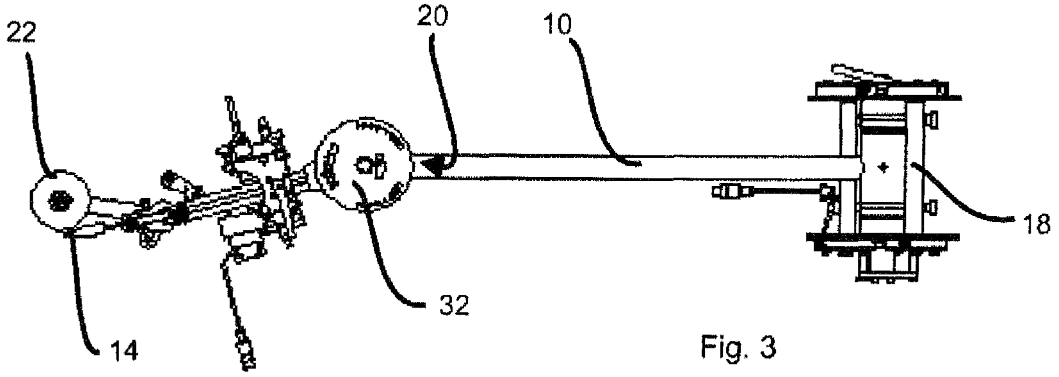
Figure 4:
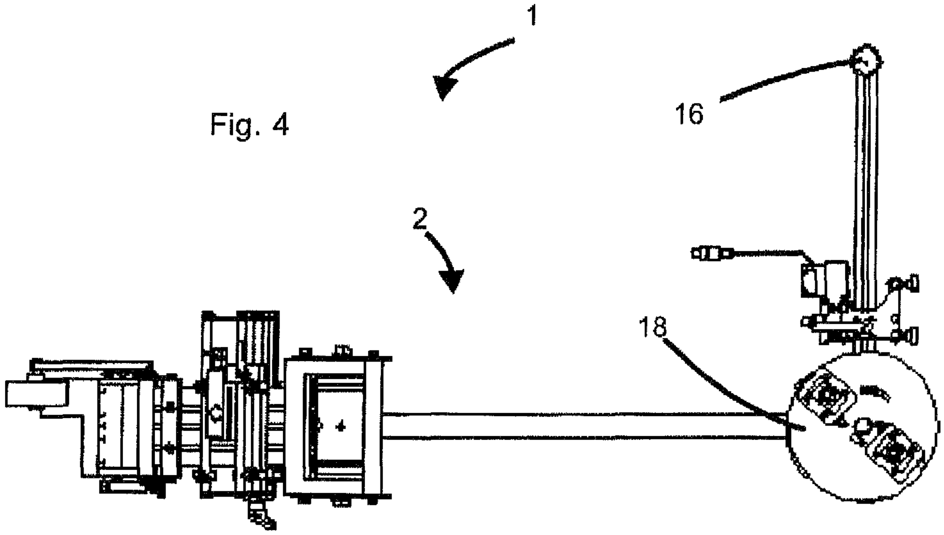

References 34 and 36 denote deflecting rollers which deflect the label belt, but deflect it in such a way that the labels do not detach from the carrier belt during this deflection. Reference 32 denotes a connecting element between the dispensing head 12 and the dispensing arm 10, wherein this connecting element 32 means that the dispensing edge 14 can move relative to the dispensing arm 10 in the plane of the figure in FIG. 3. In FIG. 4, the dispensing edge is pivotable or rotatable in a plane perpendicular to said figure, and in FIG. 2 in a plane parallel to the plane of the figure.

All of the features disclosed in the application documents are claimed as essential to the invention in so far as they are novel individually or in combination with respect to the prior art.

The invention claimed is:

1. A labelling machine for applying labels to bottle necks, wherein the labeling machine comprises a label dispensing apparatus for carrying a plurality of labels which are supplied on a carrier belt, wherein said dispensing apparatus comprises a dispensing arm and a dispensing head which is arranged on the dispensing arm and has a dispensing edge for deflecting the carrier belt in order thereby to detach a respective label, wherein the dispensing edge and/or the dispensing head is pivotable in order to adjust a movement direction of the labels being detached from the carrier belt, wherein the pivoting of the dispensing head or dispensing edge brings about a change in twisting of carrier belt relative to a transport path of the carrier belt, wherein, in order to adjust a movement direction of the labels being detached from the carrier belt, a first articulated connection is provided between the dispensing head and the dispensing arm, and in addition at least one second articulated connection is provided within the dispensing arm, and wherein a further articulated connection is provided at one or the other end of the dispensing arm.

2. The labelling machine according to claim 1, wherein the dispensing head is arranged pivotably on the dispensing arm in order to adjust the movement direction of the labels being detached from the carrier belt.

3. The labelling machine according to claim 1, wherein, in order to adjust the movement direction of the labels being detached from the carrier belt, an articulation is provided within the dispensing arm so that the dispensing head and/or the dispensing edge is pivotable.

4. The labelling machine according to claim 1, wherein the dispensing edge is arranged pivotably on the dispensing head in order to adjust the movement direction of the labels being detached from the carrier belt.

5. The labelling machine according to claim 1, wherein the dispensing edge is arranged fixedly on the dispensing head.

6. The labelling machine according to claim 1, wherein the dispensing head is pivotable relative to the second articulated connection in a direction perpendicular to a direction of extension of the dispensing arm extending between the second articulated connection and the dispensing head.

7. The labelling machine according to claim 1, wherein a pressing device is provided for pressing labels onto bottles.

8. The labelling machine according to claim 1, wherein one or more deflecting devices for the carrier belt are provided, wherein said one or more deflecting devices are dimensioned in such a way that the labels remain on the carrier belt during a deflection at this deflecting device.

9. The labelling machine according to claim 1, wherein a portion of the dispensing arm, which is located between the dispensing head and the second articulated connection is arranged rotatably on the second articulated connection.

10. The labelling machine according to claim 1, wherein the dispensing head is arranged rotatably on a portion of the dispensing arm which is located between the first articulated connection and the second articulated connection.

11. The labelling machine according to claim 1, wherein a portion of the dispensing arm which is located between the dispensing head and the second articulated connection is variable with regard to its length.

12. The labelling machine according to claim 1, wherein the dispensing arm has an articulated connection for articulating the dispensing arm on a machine frame.

13. The labelling machine according to claim 1, wherein at least one articulated connection can be locked.

* * * * *